United States Patent
Takamura et al.

(10) Patent No.: US 9,593,731 B2
(45) Date of Patent: Mar. 14, 2017

(54) RING-SHAPED SPRING AND METHOD FOR MANUFACTURING SAME

(71) Applicant: NHK SPRING CO., LTD., Yokohama-shi, Kanagawa (JP)

(72) Inventors: Noritoshi Takamura, Aiko-gun (JP); Fumio Takahashi, Aiko-gun (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 14/374,320

(22) PCT Filed: Jan. 30, 2013

(86) PCT No.: PCT/JP2013/052080
§ 371 (c)(1),
(2) Date: Jul. 24, 2014

(87) PCT Pub. No.: WO2013/115266
PCT Pub. Date: Aug. 8, 2013

(65) Prior Publication Data
US 2014/0367902 A1    Dec. 18, 2014

(30) Foreign Application Priority Data
Jan. 31, 2012    (JP) .................................. 2012-019046

(51) Int. Cl.
*C22C 38/34*    (2006.01)
*C22C 38/38*    (2006.01)
(Continued)

(52) U.S. Cl.
CPC ................ *F16F 1/34* (2013.01); *B21D 11/10* (2013.01); *B21F 35/04* (2013.01); *B23K 26/26* (2013.01);
(Continued)

(58) Field of Classification Search
CPC .... F16F 1/328; F16F 1/021; F16F 2224/0208; C22C 38/34; C22C 38/38; C22C 38/04; C22C 38/02; C21D 9/02
(Continued)

(56) References Cited

U.S. PATENT DOCUMENTS 6,206,984 B1    3/2001  Inada et al.
7,347,902 B2 *  3/2008  Mega ................... C21D 8/0263
                                                              148/320
(Continued)

FOREIGN PATENT DOCUMENTS

DE    202011002271 U1    6/2011
JP    A-6-106277          4/1994
(Continued)

OTHER PUBLICATIONS

Dec. 3, 2015 Search Report issued in European Patent Application No. 13742940.3.
(Continued)

*Primary Examiner* — Bradley King
*Assistant Examiner* — Stephen Bowes
(74) *Attorney, Agent, or Firm* — Oliff PLC

(57) ABSTRACT

An inexpensive ring spring having high strength and a method for producing the same, are provided. The ring spring can be obtained, for example, by raw material preparation, bending formation, welding, and disk formation performed in this order. The ring spring is formed to have no edge by welding two edge parts of the raw material, and has a welded metal part that is formed at the interface of the two edge parts of the raw material, and a welded heat-affected zone that is formed around the welded metal part and heated by welding, and exhibits tensile strength of 1000 MPa or more. Since the ring spring has sufficient tensile strength as a disk spring and a wave spring, quenching and tempering
(Continued)

are not necessary. Furthermore, since the product can be prevented from being deformed due to quenching and tempering, dimensional accuracy of the product can be improved.

12 Claims, 2 Drawing Sheets

(51) Int. Cl.

| | | |
|---|---|---|
| *F16F 1/34* | (2006.01) | |
| *B21D 11/10* | (2006.01) | |
| *C21D 9/02* | (2006.01) | |
| *C22C 38/00* | (2006.01) | |
| *C22C 38/02* | (2006.01) | |
| *C22C 38/08* | (2006.01) | |
| *F16F 1/02* | (2006.01) | |
| *B23K 26/26* | (2014.01) | |
| *B23P 15/00* | (2006.01) | |
| *B21F 35/04* | (2006.01) | |
| *B23K 26/32* | (2014.01) | |
| *C22C 38/04* | (2006.01) | |
| *C22C 38/18* | (2006.01) | |
| *B21D 53/16* | (2006.01) | |

(52) U.S. Cl.
CPC .............. *B23K 26/32* (2013.01); *B23P 15/00* (2013.01); *C21D 9/02* (2013.01); *C22C 38/00* (2013.01); *C22C 38/02* (2013.01); *C22C 38/04* (2013.01); *C22C 38/08* (2013.01); *C22C 38/18* (2013.01); *C22C 38/34* (2013.01); *C22C 38/38* (2013.01); *F16F 1/027* (2013.01); *B21D 53/16* (2013.01); *B23K 2201/32* (2013.01); *B23K 2203/04* (2013.01); *B23K 2203/50* (2015.10); *F16F 2226/048* (2013.01)

(58) Field of Classification Search
USPC .......................................... 148/33, 580, 506
See application file for complete search history.

(56) References Cited

U.S. PATENT DOCUMENTS

| | | | | |
|---|---|---|---|---|
| 2006/0169367 A1* | 8/2006 | Yuse | ...................... | C21D 8/065 148/320 |
| 2007/0144632 A1* | 6/2007 | Toyoda | ................ | C21D 8/0226 148/593 |
| 2007/0183867 A1 | 8/2007 | Hesselmann et al. | | |
| 2008/0075971 A1* | 3/2008 | Sun | ....................... | C22C 38/002 428/659 |
| 2008/0279714 A1 | 11/2008 | Hashimura et al. | | |
| 2011/0006467 A1 | 1/2011 | Mizuno et al. | | |
| 2011/0290382 A1* | 12/2011 | Kikuchi | ................... | C21D 1/25 148/567 |
| 2012/0070682 A1* | 3/2012 | Hatano | .................. | C21D 8/105 428/586 |
| 2012/0285585 A1 | 11/2012 | Nagamatsu et al. | | |

FOREIGN PATENT DOCUMENTS

| | | | |
|---|---|---|---|
| JP | A-8-135706 | 5/1996 | |
| JP | 0754773 A1 * | 1/1997 | ............... C21D 9/40 |
| JP | A-2001-225112 | 8/2001 | |
| JP | A-2003-329072 | 11/2003 | |
| JP | A-2004-9126 | 1/2004 | |
| JP | A-2006-183136 | 7/2006 | |
| JP | A-2007-186795 | 7/2007 | |
| JP | A-2007-198598 | 8/2007 | |
| JP | A-2011-21624 | 2/2011 | |
| JP | A-2011-52777 | 3/2011 | |
| JP | A-2011-149089 | 8/2011 | |
| WO | WO 2012/104348 A1 | 8/2012 | |

OTHER PUBLICATIONS

International Search Report issued in International Application No. PCT/JP2013/052080 mailed Apr. 16, 2013.

* cited by examiner

RING-SHAPED SPRING AND METHOD FOR MANUFACTURING SAME

TECHNICAL FIELD

The present invention relates to a ring spring, such as a disk spring or a wave spring, and relates to a method for producing the same.

BACKGROUND ART

The ring spring, such as a disk spring and a wave spring, has been used for absorbing shocks that occur during engaging a clutch in a clutch device in transportation equipment, for example. In a conventional method for producing the ring spring, a blank having approximately a ring shape has been punched out of a tabular material by pressing processing; however, in this method, the yield ratio of the material was poor. As a method to improve the yield ratio of the material, a method is known in which edge parts of material formed in a ring shape by bending formation are welded (see Japanese Unexamined Patent Application Publications Nos. Hei 06 (1994)-106277 and 2001-225112).

In a method for producing disk spring, in the case in which edge parts of the material are welded, a process shown in FIG. 4 is employed, for example. First, material is prepared (step S11), the material is formed in approximately a ring shape by bending formation (step S12), and the edge parts of the approximately ring shape material are mutually welded (step S13). According to this method, ring material having no edge can be obtained. Next, the ring material is processed to a disk shape (approximately cone shape) by cold forming (disk forming) so as to obtain disk spring material (step S14). Subsequently, by performing quenching and tempering of the disk spring material (steps S15 and S16) so as to obtain the disk spring.

However, in the method in which the edge parts of the raw material are welded, the welded part of the material becomes a welded metal part, and a circumferential part thereof becomes a welded heat-affected zone that is affected by heating during welding. In this case, since a hardened region is formed at the welded metal part and a softened region is formed at the welded heat-affected zone, in order to keep strength necessary as a disk spring, it is necessary that quenching and tempering be performed on the disk spring material after cold forming. Thus, since quenching and tempering are required and thereby increase the number of processes, production cost may be increased and the product may be expensive.

Therefore, an object of the present invention is to provide an inexpensive ring spring having high strength and a method for producing the same.

SUMMARY OF THE INVENTION

The ring spring of the present invention is a ring spring which is formed to have no edge by welding both edges of raw material, and has a welded metal part which is formed at interface part of the both edges of the raw material, and a welded heat-affected zone which is formed circumference of the welded metal part and which is heated by welding, and the ring spring has a tensile strength of 1000 MPa or more.

Since the ring spring of the present invention is obtained by welding the two edge parts of the raw material, the ring spring has the welded metal part and the welded heat-affected zone. In this case, the ring spring has tensile strength of 1000 MPa or more in a condition in which it has the welded metal part and the welded heat-affected zone, which is a sufficient tensile strength for a disk spring and a wave spring for example, and therefore, quenching and tempering are not necessary. Therefore, material yield is improved and material cost is reduced compared to a conventional method in which a blank having a ring shape is punched out by pressing processing, and in addition, production cost can be further reduced since one of a production process can be omitted compared to a conventional method in which edge parts of the material are welded. As a result, price of the product can be reduced. Furthermore, since quenching and tempering are not performed, the product can be prevented from being deformed, thereby improving dimensional accuracy of the product.

Various constructions can be employed as the ring spring of the present invention. For example, with respect to chemical components, the content of C should be decreased since a larger content of C may cause formation of a quenching hardened layer and decrease of toughness. However, in the case in which content of C is reduced, since strength may be decreased, it may be necessary to increase strength by action of solid-solution strengthening and miniaturization of crystal particles or the like, brought by adding an element other than C.

In this case, with respect to chemical components of the material, an embodiment containing C: 0.10 to 0.30 mass %, Si: 0.50 to 2.10 mass %, Cr: 0.50 to 1.50 mass %, Mn: 1.0 to 2.0 mass %, P: 0.025 mass % or less, S: 0.025 mass % or less, Fe as a remainder and inevitable impurities can be used, for example.

Hereinafter, basis for the above numeric limitation of each element is explained. It should be noted that "%" always means "mass %" in the following explanation.

C: 0.10 to 0.30%

C is an important element to maintain strength of the welded part. Strength of the welded part may be insufficient in a case in which content of C is less than 0.10%. On the other hand, in a case in which content of C is more than 0.30%, a hardened structure such as martensite or the like is increased, a quenched hardened layer is formed, and toughness is decreased. Therefore, in order to improve strength of the welded part and toughness, content of C is set within 0.10 to 0.30%.

Si: 0.50 to 2.10%

Si is an important element to maintain strength of the welded part as an element to strengthen solid solution. Strength of the welded part may be insufficient in a case in which content of Si is less than 0.50%. On the other hand, in a case in which content of Si is more than 2.10%, the effect of maintaining strength may be saturated and properties of welding may be degraded. Therefore, in order to improve strength of the welded part and property of welding, content of Si is set within 0.50 to 2.10%.

Cr: 0.50 to 1.50%

Cr is an effective element to increase strength of the welded part. Strength of the welded part may be insufficient in a case in which the content of C is less than 0.50%. On the other hand, in a case in which the content of C is more than 1.50%, toughness is decreased. Therefore, in order to improve strength of the welded part and toughness, the content of Cr is set within 0.50 to 1.50%.

Mn: 1.0 to 2.0%

Mn is an effective element to prevent hot brittleness by S, in addition to improve strength as an element to strengthen a solid solution. Strength may be insufficient in a case in which the content of Mn is less than 1.0%. On the other hand, in a case in which the content of Mn is more than 2.0%, workability is decreased. Therefore, in order to improve strength and workability, the content of Mn is set within 1.0 to 2.0%.

P: 0.025% or less

It is desirable that the content of P be as low as possible, since a high content of P may cause deterioration of workability and welding property. The P content of 0.025% or less can be acceptable in order to maintain workability and welding property in a ring spring.

S: 0.025% or less

It is desirable that the content of S be as low as possible, since a high content of S may cause deterioration of ductility. The S content of 0.025% or less can be acceptable in order to maintain ductility in a ring spring.

With respect to chemical components of the material of the ring spring of the present invention, in order to effectively obtain the above effects by C, Cr and Mn, more desirable ranges are as follows. That is, an embodiment including C: 0.15 to 0.25 mass %, Si: 0.50 to 2.10 mass %, Cr: 0.8 to 1.1 mass %, Mn: 1.3 to 1.7 mass %, P: 0.025 mass % or less, S: 0.025 Mass % or less, Fe as a remainder and inevitable impurities is more desirable.

The above chemical composition is a basic composition, in addition, in order to further improve strength of the welded metal part and toughness, at least one of Ni, Mo, Ti, V and Nb can be added.

As a raw material, a steel material having carbon equivalent Ceq shown by below formula (1) of 0.5 to 0.75 mass % and hardness of 350 HV or more can be used, and the steel material can contain C: 0.30 mass % or less. It should be noted that in the formula (1), "[ ]" means content (mass %) of each element.

$$Ceq=[C]+[Mn]/6+[Si]/24+[Ni]/40+[Cr]/5+[Mo]/4+[V]/14 \quad (1)$$

In a case in which carbon equivalent Ceq is less than 0.5 mass %, strength that is required for a ring spring cannot be maintained, and in a case in which Ceq is more than 0.75 mass %, hardness of the welded metal part may be too large and toughness may be decreased. Therefore, in order to effectively realize maintaining of strength and improvement of toughness required for a ring spring, the carbon equivalent Ceq is set from 0.5 to 0.75 mass %. Furthermore, by limiting the hardness of the raw material (master material) at 350 HV or more, strength that is required for a material after welding can be effectively obtained.

There may be a case in which shrinkage, possibly caused by stress concentration, occurs at the welded metal part, and the shrinkage is unlikely to occur at the welding start part and is likely to occur at the welding end part. Therefore, it is desirable that the welding start part of the welded metal part be formed at one of an outer circumferential part or inner circumferential part having higher tensile stress.

As a ring spring, for example, a disk spring having a disk shape or a wave spring having a wavy shape consisting of a mountain part and a valley part can be mentioned. In the case in which the wave spring is used, it is desirable that the mountain part and the valley part, at which stress generation peaks, be formed at a position different from the welded metal part.

A method for producing ring spring of the present invention includes steps of: a bending forming process in which raw material is formed in approximately a ring shape by bending forming, a welding process in which edge parts of the raw material of the approximately ring shape are mutually welded so as to obtain a raw material ring having no edge, in which in the welding process, a welded metal part is formed at an interface of the two edge parts of the raw material, and welded heat-affected zone which is heated by welding is formed around the welded metal part, and in which the ring spring has tensile strength of 1000 MPa or more.

According to the method for producing the ring spring of the present invention, a ring spring having the above effects can be produced.

According to the ring spring or the method for producing the same of the present invention, the product can be strengthened and the cost can be reduced at the same time.

Figure 1:
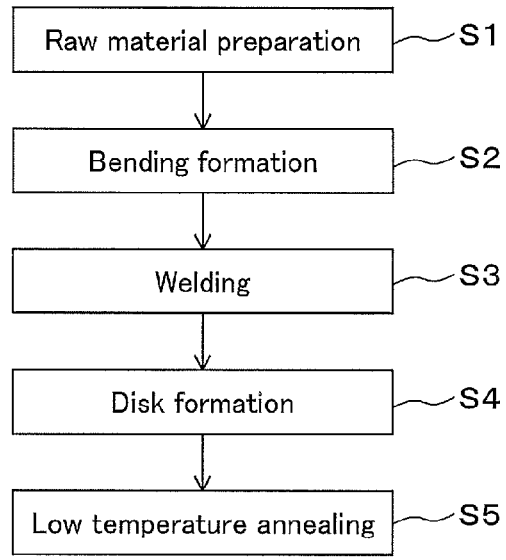
FIG. 1 is a flow chart diagram showing the production processes of the method for producing the ring spring of one Embodiment of the present invention.

EXPLANATION OF REFERENCE NUMERALS 1A, 1B: Raw material ring having no edge, 2: wave spring, 11: outer circumferential part, 12: inner circumferential part, 13, 33: welded metal part, 21: convex part, 31: mountain part, 32: valley part.

BEST MODE FOR CARRYING OUT THE INVENTION

Hereinafter, an Embodiment of the present invention is explained with reference to the drawings. FIG. 1 is the flow chart diagram showing the production processes of the method for producing the ring spring of one Embodiment of the present invention. In this Embodiment, as shown in FIG. 1 for example, raw material preparation (step S1), bending formation (step S2), welding (step S3), disk formation (step S4), and low-temperature annealing (step S5) are performed in this order.

First, the raw material is prepared (step S1). As the raw material, a material that has tensile strength of 1000 MPa or more in a condition in which the ring spring obtained from the raw material has a welded metal part and a welded heat-affected zone, is used.

As the raw material, it is desirable that the steel material having carbon equivalent Ceq shown by the below formula (1) of 0.5 to 0.75 mass % and hardness of 350 HV or more be used, and that the steel material contains C: 0.30 mass % or less. It should be noted that "[ ]" means content amount of each element (mass %) in the formula (1).

$$Ceq=[C]+[Mn]/6+[Si]/24+[Ni]/40+[Cr]/5+[Mo]/4+[V]/14 \quad (1)$$

With respect to a practical chemical composition, it is desirable that the raw material contain C: 0.10 to 0.30 mass %, Si: 0.50 to 2.10 mass %, Cr: 0.50 to 1.50 mass %, Mn: 1.0 to 2.0 mass %, P: 0.025 mass % or less, S: 0.025 mass % or less, Fe as the remainder and inevitable impurities.

With respect to C, Cr, and Mn, more desirable content amounts are C: 0.15 to 0.25 mass %, Cr: 0.8 to 1.1 mass %, and Mn: 1.3 to 1.7 mass %.

The raw material can be obtained for example, a material which is austenitized and then rapid-cooled, a material which is austenitized and then austempering-treated, or a material which is austenitized and then patenting-treated, is processed by wire drawing. As a structure of the raw material, wire material, tabular material, strip material or the like is used. In this case, kinds of structure such as elongated material, hoop material, coil material, and fixed scale material can be used. As a cross-sectional shape of the raw material, it is not limited only to a square cross section, and other cross section such as trapezoid, ellipse or the like can be employed.

Next, by forming the raw material in a ring shape by bending formation, the raw material ring is obtained (step S2). In this case, for example, by facing edge surfaces of the two edge parts of the raw material each other, the facing part is formed. It should be noted that the raw material can be formed as a raw material ring having a disk shape (approximately cone shape) by performing disk formation and bending formation at the same time. Furthermore, by performing wave shape formation instead of disk formation, a raw material ring having wavy shape consisting of mountain part and valley part can be made. In these cases, following disk formation or wavy shape formation of step S4 can be omitted.

Next, the facing part of the raw material ring is welded thereby obtaining the raw material ring having no edge (step S3). The raw material ring having no edge has the welded metal part that is formed at an interface of two edge parts of the raw material, and the welded heat-affected zone that is formed around the welded metal part and is heated during welding. Various methods can be employed as the welding method, and it is not limited in particular, but a laser welding is desirable. In the laser welding, since the emission spot is small, formation of the welded heat-affected zone can be reduced. A convex bead formed on the welded metal part can be removed if necessary.

In a case in which the disk spring is produced, for example, at a concave surface side in which tensile stress occurs during elastic deformation in order to lower the height along an axis line direction, it can be designed so that tensile stress of the outer circumferential part is higher than that of the inner circumferential part, or so that tensile stress of the inner circumferential part is higher than that of the outer circumferential part. In this case, it is desirable that the welding direction be determined as follows in view of the possibility of the occurrence of shrinkage by welding.

Figure 2A:
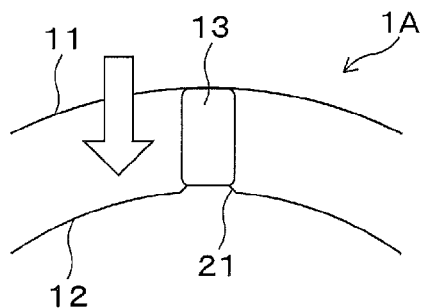
FIGS. 2A and 2B are conceptual diagrams showing a desirable example of welding in the method for producing the ring spring of one Embodiment of the present invention.
Figure 2B:
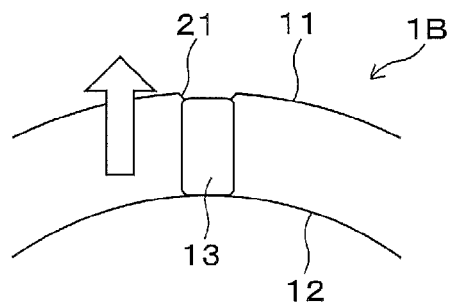

FIG. 2A shows a raw material ring 1A that is used as a raw material of a disk spring in which tensile stress of outer circumferential part 11 is set higher than that of inner circumferential part 12. In the raw material ring 1A, when welding is performed along a direction (arrow line direction) from the outer circumferential part 11 to the inner circumferential part 12, welded metal part 13 is formed at facing part. In this case, shrinkage occurs at the inner circumferential part 12 in which tensile stress is low, thereby forming concave part 21, and the concave part is not formed at the outer circumferential part 11 having high tensile stress. FIG. 2B shows a raw material ring 1B that is used as a raw material of a disk spring in which tensile stress of inner circumferential part 12 is set higher than that of outer circumferential part 11. In the raw material ring 1B, when welding is performed along a direction (arrow line direction) from the inner circumferential part 12 to the outer circumferential part 11, shrinkage occurs at the outer circumferential part 11 in which tensile stress is low, thereby forming concave part 21, and concave part is not formed at the inner circumferential part 12 having high tensile stress. In this way, it is desirable that welding be performed from a circumferential part having high tensile stress to a circumferential part having low tensile stress.

Figure 3:
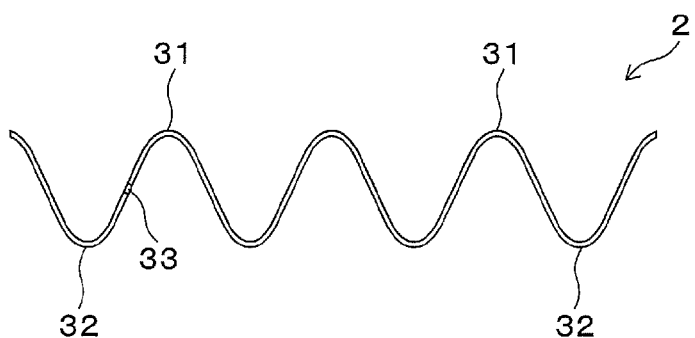
FIG. 3 is a part of a development diagram showing a side view of skeleton framework of a practical example of the wave spring as a ring spring of one Embodiment of the present invention.
Figure 4:
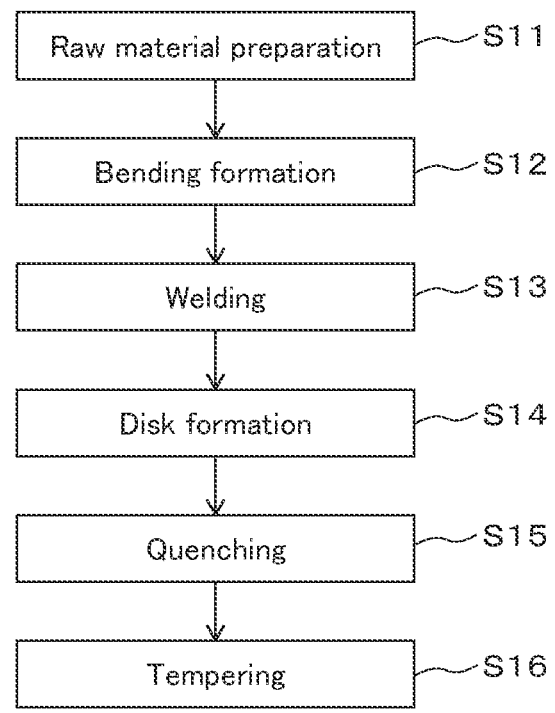
FIG. 4 is a flow chart diagram showing the production processes of a conventional method for producing the ring spring.

Next, disk forming is performed on the raw material ring having no edge, the approximately cone disk spring (ring spring) is obtained (step S4). Practically, by flattening the raw material ring having no edge into an approximately oblate condition having a certain thickness by hot or cold press forming, the approximately cone disk spring is obtained. It should be noted that the wave spring (ring spring) can be obtained by performing wavy formation by cold or hot pressing, instead of by disk formation. For example, in a case in which wave spring 2 shown in FIG. 3 is produced, it is desirable that mountain part 31 and valley part 32 be formed at a position different from the welded metal part 33.

Next, if necessary, strain can be removed (step S5) by performing low-temperature annealing on the ring spring (disk spring or wave spring). The low-temperature annealing is performed at 250° C. for 60 minutes, for example. It should be noted that temperature or time for heating can be controlled, if necessary. In the case in which the ring spring is used in hot condition, low-temperature annealing is desirable since deformation can be controlled.

The ring spring produced in this Embodiment is obtained by welding both edge parts of the raw material, and the ring spring has the welded metal part and the welded heat-affected zone. In this case, since tensile strength is 1000 MPa or more in the condition in which the ring spring has the welded metal part and the welded heat-affected zone, being of sufficient tensile strength as a disk spring and a wave spring, quenching and tempering are not necessary. Therefore, production cost can be reduced. As a result, price of the product can be reduced. Furthermore, since quenching and tempering are not performed, as a result of preventing the product from being deformed, dimensional accuracy of the product can be improved.

The present invention was explained as above by way of an Embodiment, but the present invention is not limited to the above Embodiment, and variations are possible. For example, in the method for producing the ring spring, shot peening can be performed on the ring spring to obtain compressive residual stress and barrel polishing can be performed on the ring spring to improve surface cleanliness, if necessary. In addition, in a case in which a disk spring is produced as a ring tabular spring, multiple convex parts (nail parts) can be arranged on an inner or outer circumferential part of the main body of the disk spring. With respect to usage configuration of the disk spring, a single disk spring can be used, or multiple disk springs can be used arranged in series or in parallel. In the case in which multiple disk springs are used, for example, disk springs can be welded in order to prevent misalignment of positions.

EXAMPLES

Hereinafter the Embodiment of the invention is further explained with reference to practical Examples.

In the Examples, disk springs were produced using kinds of raw materials each having chemical composition, carbon equivalent Ceq, (unit: mass %), hardness (unit: HV), and tensile strength (TS before welding, unit: MPa) shown in Table 1. Durability test of each disk spring was performed so that it could be determined whether it passed or failed the test.

TABLE 1

|  | Component (mass %) | | | | | | TS before welding (MPa) | Hardness (HV) | Carbon equivalent (mass %) |
| --- | --- | --- | --- | --- | --- | --- | --- | --- | --- |
|  | C | Si | Mn | Cr | P | S |  |  |  |
| Comparative Example A | 0.2 | 0.88 | 1.49 | 0.94 | 0.015 | 0.012 | 917 | 292 | 0.67 |
| Example B | 0.2 | 0.88 | 1.49 | 0.94 | 0.015 | 0.012 | 1491 | 480 | 0.67 |
| Example C | 0.2 | 0.88 | 1.49 | 0.94 | 0.015 | 0.012 | 1686 | 530 | 0.67 |
| Example D | 0.21 | 1.6 | 1.6 | 1 | 0.013 | 0.011 | 1710 | 535 | 0.74 |
| Comparative Example E | 0.85 | 0.23 | 0.3 | 0 | 0.015 | 0.014 | 1318 | 420 | 0.91 |
| Comparative Example F | 0.62 | 0.27 | 0.51 | 0 | 0.016 | 0.015 | 1755 | 555 | 0.72 |
| Comparative Example G | 0.16 | 0.26 | 0.44 | 0 | 0.012 | 0.01 | 449 | 155 | 0.24 |
| Comparative Example H | 0.44 | 0.24 | 0.8 | 0 | 0.014 | 0.012 | 791 | 256 | 0.58 |
| Comparative Example I | 0.31 | 0.4 | 0.6 | 0.55 | 0.014 | 0.013 | 1150 | 365 | 0.54 |
| Example J | 0.17 | 0.8 | 1.4 | 0.9 | 0.016 | 0.014 | 1395 | 455 | 0.62 |
| Example K | 0.1 | 0.85 | 1.2 | 0.9 | 0.012 | 0.01 | 1102 | 352 | 0.52 |

Practically, with respect to all the samples A to K, raw material (width: 7 mm, thickness: 1.5 mm) was processed by bending formation so as to obtain raw material rings (outer diameter: 100 mm). In this case, both edge parts of the raw material were brought into facing condition. Next, the facing part was welded by laser so as to obtain a raw material ring having no edge, and a disk spring (free height: 2.5 mm) was produced by performing cold disk formation on the raw material ring. Conditions of production of the samples such as bending formation, laser welding, and disk formation were all the same except that chemical composition or like of the raw material were different, as shown in Table 1.

With respect to the disk springs of all the samples A to K, tensile strength (TS after welding, unit: MPa) was measured and durability test was performed. The results are shown in Table 2. In the durability test, a displacement control type fatigue testing machine was used, and the disk spring was oscillated from a free height to a fitting height. With respect to the durability test results shown in Table 2, a sample that was not broken at 100,000 times was regarded as having passed (O), and a sample that was broken was regarded as having failed (X). With respect to the broken samples, its broken origin is shown, whether the ring was broken at the "heat-affected zone" or "welded metal".

TABLE 2

|  | TS after welding (MPa) | Durability test result | Breaking origin |
| --- | --- | --- | --- |
| Comparative Example A | 870 | X | Heat-affected zone |
| Example B | 1441 | O | — |
| Example C | 1620 | O | — |
| Example D | 1600 | O | — |
| Comparative Example E | 640 | X | Welded metal |
| Comparative Example F | 750 | X | Welded metal |
| Comparative Example G | 432 | X | Heat-affected zone |
| Comparative Example H | 653 | X | Welded metal |
| Comparative Example I | 920 | X | Welded metal |
| Example J | 1310 | O | — |
| Example K | 1045 | O | — |

As shown in Table 1, Examples B, C, D, J, and K of the present invention that were produced using raw material having chemical composition, carbon equivalent, hardness and TS before welding within the range of the present invention as shown in Table 1 were not broken during the durability test and exhibited tensile strength of 1000 MPa or more, as shown in Table 2.

On the other hand, all of the Comparative Examples A, E, F, G, H, and I were broken during the durability test and exhibited tensile strength after welding of less than 1000 MPa. Comparative Examples A and G have content amount of C of less than 0.3 mass %; however, they were considered to be broken at the welded heat-affected part because hardness of the raw material (master material) was low, being less than 350 HV, and had originally low strength, and further decreased in strength by influence of heat.

With respect to Comparative Examples E, F, H, and I, it is considered that the content of C was over 0.3 mass %, hardness of the welded metal part was too great, toughness was decreased, and thereby they soon exhibited fatigue failure and broke at the welded metal part.

As explained, it was confirmed that the ring spring that is produced using raw material having the chemical composition, carbon equivalent, hardness and tensile strength before welding within the range of the present invention exhibits high strength with a tensile strength of 1000 MPa or more even without performing quenching.

The invention claimed is:

1. A ring spring formed to be endless by welding two ends of a raw material, the raw material being a steel material containing C: 0.10 to 0.30 mass %, Si: 0.50 to 2.10 mass %, Cr: 0.50 to 1.50 mass %, Mn: 1.0 to 2.0 mass %, P: 0.025 mass % or less, S: 0.025 mass % or less, Fe as a remainder and inevitable impurities, the steel material having carbon equivalent Ceq shown by Formula (1) below of 0.5 to 0.75 mass % and hardness of 350 HV or more as the raw material, wherein brackets indicate mass %, the ring spring comprising:
a welded metal part formed at an interface of the two ends of the raw material, and
a welded heat-affected zone formed at the circumference of the welded metal part and which is heated by welding,
wherein tensile strength is 1000 MPa or more, and
wherein the ring spring is formed without quenching and tempering, $$Ceq=[C]+[Mn]/6+[Si]/24+[Ni]/40+[Cr]/5+[Mo]/4+[V]/14 \qquad (1).$$

2. The ring spring according to claim 1, wherein a welding start part of the welded metal part is formed at one of an outer circumferential part or an inner circumferential part having higher tensile stress than the other.

3. The ring spring according to claim 1, wherein the ring spring is a disk spring having a disk shape or a wave spring having a wavy shape consisting of a mountain and a valley.

4. The ring spring according to claim 1, wherein the ring spring is a wave spring having a wavy shape consisting of a mountain and a valley, and the mountain and the valley are formed at a position different from the welded metal part.

5. A method for producing a ring spring, the method comprising steps of:
a bending forming process in which raw material is formed in approximately a ring shape by bending forming,
the raw material being a steel material containing C: 0.10 to 0.30 mass %, Si: 0.50 to 2.10 mass %, Cr: 0.50 to 1.50 mass %, Mn: 1.0 to 2.0 mass %, P: 0.025 mass % or less, S: 0.025 mass % or less, Fe as a remainder and inevitable impurities,
the steel material having carbon equivalent Ceq shown by Formula (1) below of 0.5 to 0.75 mass % and hardness of 350 HV or more as the raw material, wherein brackets indicate mass %,
a welding process in which end parts of the raw material of the approximately ring shape are mutually welded so as to obtain a raw material ring having no end,
wherein in the welding process, a welded metal part is formed at an interface of the two end parts of the raw material, and a welded heat-affected zone that is heated by welding is formed around the welded metal part, and
wherein the ring spring has tensile strength of 1000 MPa or more, and
wherein the ring spring is produced without quenching and tempering, $$Ceq=[C]+[Mn]/6+[Si]/24+[Ni]/40+[Cr]/5+[Mo]/4+[V]/14 \quad (1).$$

6. A ring spring formed to be endless by welding two ends of a raw material, the raw material being a steel material consisting of C: 0.10 to 0.30 mass %, Si: 0.50 to 2.10 mass %, Cr: 0.50 to 1.50 mass %, Mn: 1.0 to 2.0 mass %, P: 0.025 mass % or less, S: 0.025 mass % or less, Fe as a remainder and inevitable impurities,
the steel material having carbon equivalent Ceq shown by Formula (1) below of 0.5 to 0.75 mass % and hardness of 350 HV or more as the raw material, wherein brackets indicate mass %,
the ring spring comprising:
a welded metal part formed at an interface of the two ends of the raw material, and
a welded heat-affected zone formed at the circumference of the welded metal part and which is heated by welding,
wherein tensile strength is 1000 MPa or more, $$Ceq=[C]+[Mn]/6+[Si]/24+[Ni]/40+[Cr]/5+[Mo]/4+[V]/14 \quad (1).$$

7. The ring spring according to claim 6, wherein the ring spring is formed without quenching and tempering.

8. The ring spring according to claim 6, wherein a welding start part of the welded metal part is formed at one of an outer circumferential part or an inner circumferential part having higher tensile stress than the other.

9. The ring spring according to claim 6, wherein the ring spring is a disk spring having a disk shape or a wave spring having a wavy shape consisting of a mountain and a valley.

10. The ring spring according to claim 6, wherein the ring spring is a wave spring having a wavy shape consisting of a mountain and a valley, and the mountain and the valley are formed at a position different from the welded metal part.

11. A method for producing a ring spring, the method comprising steps of:
a bending forming process in which raw material is formed in approximately a ring shape by bending forming,
the raw material being a steel material consisting of C: 0.10 to 0.30 mass %, Si: 0.50 to 2.10 mass %, Cr: 0.50 to 1.50 mass %, Mn: 1.0 to 2.0 mass %, P: 0.025 mass % or less, S: 0.025 mass % or less, Fe as a remainder and inevitable impurities,
the steel material having carbon equivalent Ceq shown by Formula (1) below of 0.5 to 0.75 mass % and hardness of 350 HV or more as the raw material, wherein brackets indicate mass %,
a welding process in which end parts of the raw material of the approximately ring shape are mutually welded so as to obtain a raw material ring having no end,
wherein in the welding process, a welded metal part is formed at an interface of the two end parts of the raw material, and a welded heat-affected zone that is heated by welding is formed around the welded metal part, and
wherein the ring spring has tensile strength of 1000 MPa or more, $$Ceq=[C]+[Mn]/6+[Si]/24+[Ni]/40+[Cr]/5+[Mo]/4+[V]/14 \quad (1).$$

12. The method for producing a ring spring according to claim 11, wherein quenching and tempering are not performed.

\* \* \* \* \*